United States Patent
Park et al.

(10) Patent No.: US 8,512,894 B2
(45) Date of Patent: Aug. 20, 2013

(54) RECHARGEABLE BATTERY HAVING A PROTECTIVE CASE

(75) Inventors: Kyungho Park, Yongin-si (KR); Seok Koh, Yongin-si (KR); Eunok Kwak, Yongin-si (KR); Kyungwon Seo, Yongin-si (KR); Jeongdeok Byun, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 971 days.

(21) Appl. No.: 12/285,094

(22) Filed: Sep. 29, 2008

(65) Prior Publication Data
US 2009/0087692 A1     Apr. 2, 2009

(30) Foreign Application Priority Data

Sep. 28, 2007   (KR) .................. 10-2007-0097985

(51) Int. Cl.
*H01M 2/10*   (2006.01)
*H01M 2/02*   (2006.01)

(52) U.S. Cl.
USPC .............................. 429/163; 429/7

(58) Field of Classification Search
USPC ....... 429/163, 7, 175, 176, 177, 162; 16/225, 16/226, 227, 385, 13
See application file for complete search history.

(56) References Cited

U.S. PATENT DOCUMENTS

| 5,882,816 | A | * | 3/1999 | Gotou | 429/100 |
| 6,048,642 | A | * | 4/2000 | Woolsey | 429/163 |
| 6,117,576 | A | * | 9/2000 | Sugai | 429/7 |
| 6,893,773 | B2 | * | 5/2005 | Hayashi et al. | 429/162 |
| 7,052,798 | B2 | * | 5/2006 | Kaelin et al. | 429/96 |
| 2002/0140401 | A1 | | 10/2002 | Watanabe et al. | |
| 2003/0114606 | A1 | * | 6/2003 | Taniguchi et al. | 525/523 |
| 2003/0157399 | A1 | * | 8/2003 | Ikeuchi et al. | 429/62 |
| 2005/0031952 | A1 | * | 2/2005 | Hayashi et al. | 429/185 |
| 2005/0079412 | A1 | * | 4/2005 | Kim | 429/176 |
| 2006/0266542 | A1 | * | 11/2006 | Yoon | 174/112 |

(Continued)

FOREIGN PATENT DOCUMENTS

| JP | 05-90809 U | 12/1993 |
| JP | 08-329972 A | 12/1996 |

(Continued)

OTHER PUBLICATIONS

Machine translation for Hashimoto, JP 2007-179979 A.*

(Continued)

*Primary Examiner* — Edu E Enin-Okut
(74) *Attorney, Agent, or Firm* — Robert E. Bushnell, Esq.

(57) ABSTRACT

A secondary battery having a hard case that is integrally formed to be able to reduce the number of parts and the fabrication process. The secondary battery includes at least one bare cell, a circuit part electrically coupled to the at least one bare cell and a case covering the circuit part coupled to the at least one bare cell, wherein the case includes a main case arranged on a first surface of the at least one bare cell and at least one sub case arranged on at least one different surface of the at least one bare cell that is adjacent to the first surface of the at least one bare cell, each of the at least one sub case being integral to the main case.

18 Claims, 10 Drawing Sheets

(56) References Cited

U.S. PATENT DOCUMENTS

| | | |
|---|---|---|
| 2006/0275657 A1 | 12/2006 | Kozuki et al. |
| 2007/0054180 A1* | 3/2007 | Miyajima et al. ............... 429/96 |
| 2007/0154803 A1 | 7/2007 | Kim et al. |
| 2007/0196733 A1 | 8/2007 | Lee |
| 2008/0171235 A1 | 7/2008 | Seo et al. |
| 2008/0193838 A1 | 8/2008 | Oh |
| 2009/0317703 A1* | 12/2009 | Kwag et al. ................... 429/159 |

FOREIGN PATENT DOCUMENTS

| | | | |
|---|---|---|---|
| JP | 2001-196048 A | | 7/2001 |
| JP | 2002-198011 A | | 7/2002 |
| JP | 2002298807 | | 10/2002 |
| JP | 2003-157814 A | | 5/2003 |
| JP | 2003157814 A | * | 5/2003 |
| JP | 2005-276571 A | | 10/2005 |
| JP | 2006-004882 A | | 1/2006 |
| JP | 2007-073203 A | | 3/2007 |
| JP | 2007157452 A | * | 6/2007 |
| JP | 2007-179979 A | | 7/2007 |
| JP | 2007179979 A | * | 7/2007 |
| JP | 2008-034208 A | | 2/2008 |
| KR | 2006-0084888 A | | 7/2006 |
| KR | 2006-0110405 A | | 10/2006 |
| KR | 1020070075707 A | | 7/2007 |
| KR | 2007-0108800 A | | 11/2007 |
| KR | 100824865 B1 | | 4/2008 |

OTHER PUBLICATIONS

Machine translation for Mauyama et al., JP 2003-157814 A.*
Japanese Office action issued by Japanese Patent Office on Nov. 22, 2011, corresponding to JP Application No. 2008-247725 and Request for Entry attached herewith.
Japanese Office Action dated Nov. 6, 2012 in connection with Japanese Patent Application No. 2008-247725 and Request for Entry of the Accompanying Office Action attached herewith.

* cited by examiner

RECHARGEABLE BATTERY HAVING A PROTECTIVE CASE

CLAIM OF PRIORITY

This application makes reference to, incorporates the same herein, and claims all benefits accruing under 35 U.S.C. §119 from an application earlier filed in the Korean Intellectual Property Office on Sep. 28, 2007 and there duly assigned Serial No. 10-2007-0097985.

BACKGROUND OF THE INVENTION

1. Field of the Invention

The present invention relates to a secondary battery having a hard case that is integrally formed resulting in a reduced number of parts and a simplified fabrication process.

2. Description of the Related Art

Unlike the primary battery that is not rechargeable, the secondary battery is rechargeable and dischargeable for dozens of times. Secondary batteries are widely used in portable electronic apparatuses, such as cellular phones, laptop computers, camcorders, and even hybrid vehicles.

The type of the secondary battery is determined based on materials used for the positive electrode plate and the negative electrode plate, the appearance of the battery, or its application. The shape of the secondary battery can be either cylinder type or square type. The square type secondary battery has an electrode assembly received within a flat can. The square type secondary battery is produced by attaching a circuit unit, a case, and a label on the outside of the bare cell, where the bare cell includes an electrode assembly and a cap assembly inside the can.

For a secondary battery, more than two kinds of materials are used in producing the case, thereby increasing the fabricating cost. Specifically, a hard case, which was manufactured in advance, protects a part of the can. A part of the hard case and a part of the can form a molding case by using hot molten resin. To achieve this, processes of manufacturing two hard cases, attaching a hard case to a can, and molding by the use of hot molten resin are needed. However, the bare cell often breaks during the molding process because the bare cell, which accommodates an electrode assembly, an electrolyte, and a cap assembly inside a can, is directly influenced by the molding process, thereby deteriorating the yield. For example, there are various reasons for breakage of the bare cell, such as breakage from inserting the bare cell into a mold to form a molding case, breakage by heat when applying a hot molten resin, and breakage by pressure of a mold, thereby deteriorating the yield and increasing the fabricating cost.

Furthermore, additional space for the bare cell is required when manufacturing a mold, thereby increasing costs for manufacturing a mold. It is also a problem that the molding process can only be performed after the bare cell has been attached to the hard case. As a result, it is not easy to remove the case after finishing the molding process when there is something wrong with the circuit module. Therefore, it is not feasible to recycle the bare cell, even if the bare cell has no defects.

SUMMARY OF THE INVENTION

The present invention has been contrived to solve aforementioned problems and to provide a secondary battery having a hard case which is easily attached and detached and can be manufactured in advance.

The goal of the present invention is to provide a secondary battery including a hard case which is integrally formed to be able to reduce the number of parts and the fabrication costs.

Another goal of the present invention is to provide a secondary battery including a hard case, where a core pack can be connected to the hard case by bending the hard case, resulting in a convenient assembly process.

To accomplish the goals mentioned above, the secondary battery of the present invention includes at least one bare cell, a circuit part electrically coupled to the at least one bare cell and a case covering the circuit part coupled to the at least one bare cell, wherein the case includes a main case arranged on a first surface of the at least one bare cell and at least one sub case arranged on at least one different surface of the at least one bare cell that is adjacent to the first surface of the at least one bare cell, each of the at least one sub case being integral to the main case.

The at least one sub case can include two sub cases, each of the two sub cases can be attached at opposite ends of the main case, the two sub cases can be arranged on corresponding surfaces of the at least one bare cell adjacent to the first surface of the at least one bare cell. Each of the first surface and the corresponding surfaces of the at least one bare cell can be narrow, the first surface can be longer than ones of the corresponding surfaces of the at least one bare cell. The main case can include a body that accommodates the circuit part within and a plurality of sides extending from the body and partly surrounding corresponding surfaces of the at least one bare cell that are adjacent to the first surface of the at least one bare cell. The main case can include a body in having a plate shape that corresponds to the first surface of the at least one bare cell, and a plurality of sides extending from the body and partly surrounding corresponding surfaces of the at least one bare cell that are adjacent to the first surface of the at least one bare cell.

The main case and the at least one sub case can be integrally connected via a connecting part. The connecting part can connect a side of the main case to a body of the at least one sub case. The connecting part can be an entire surface type connecting part having a same width as that of a body of the at least one sub case. The connecting part can be a narrow width type connecting part having a smaller width than that of a body of the at least one sub case. The connecting part can be a lattice type connecting part partly having a lattice type aperture. The connecting part can be a round type connecting part having a wider center portion than both ends thereof. A thickness of the connecting part can be equal to or less than a smaller of a thickness of the main case and a thickness of the at least one sub case. A thickness of the connecting part can be ⅔ of the smaller of a thickness of the main case and a thickness of the at least one sub case.

A cross-section of the connecting part can be L-shaped. The L-shaped connecting part can have a curved inner surface corresponding to the at least one bare cell and a curved outer surface opposite to the curved inner surface. One of the inner surface corresponding to the at least one bare cell and the outer surface opposite to the inner surface of the L-shaped connecting part can be curved. One of the inner surface corresponding to the at least one bare cell and the outer surface opposite to the inner surface of the L-shaped connecting part can be planar. An insulation member can be arranged between the at least one bare cell and the circuit part. A label can be attached to an outer surface of the at least one bare cell. A label can be attached to surround the connecting part of the case. A label can be attached to surround a body and a side of the at least one sub case and a side of the main case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6b is a perspective view which a label is added to core pack and case of FIG. 6a;

DETAILED DESCRIPTION OF THE INVENTION

Figure 1:
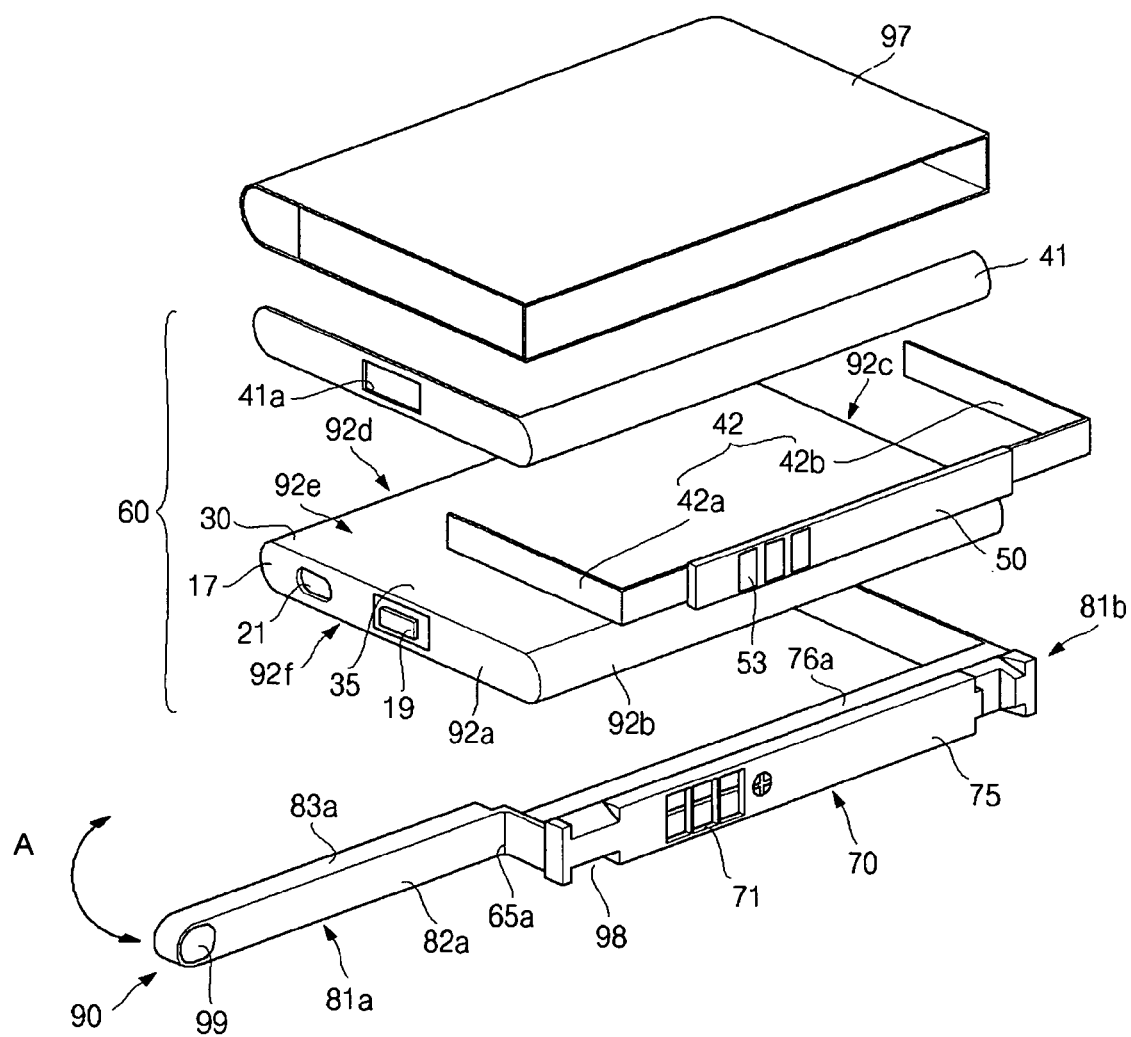
FIG. 1 is an exploded perspective view of the secondary battery according to one embodiment of the present invention.

Turning now to FIG. 1, FIG. 1 is an exploded perspective view of the secondary battery according to one embodiment of the present invention. Referring to FIG. 1, the secondary battery of the present invention includes a bare cell 35, a circuit part 50, a case 90, and a label 97. The secondary battery further includes an insulating member 41 and a lead 42.

A bare cell 35 includes a can 30. The can 30 has a cavity inside that approximates a rectangular shape, but the shape of the can 30 is not limited to this. An electrode assembly (not shown) is accommodated within the can 30. FIG. 1 describes an electrode terminal 19 and a cap plate 17, which includes a safety vent 21, that are connected to the can 30 of the bare cell 35. The electrode assembly will be described later.

The bare cell 35 will be explained on the assumption that the surface to which an electrode terminal 19 of the bare cell 35 and the cap plate 17 is arranged on is the first surface 92a, which is a small surface. Another small surface neighboring the first surface 92a is second surface 92b. The surface opposite to the first surface 92a is a third surface 92c. The surface opposite to the second surface 92b is a fourth surface 92d. The remaining surfaces of can 30 are large surfaces and include fifth surface 92e and sixth surface 92f opposite to fifth surface 92e. The electrode terminal 19 is located at the first surface 92a and the electrode terminal 19 is used as a positive electrode or a negative electrode, however the following description will assume that the electrode terminal 19 is a negative electrode and the can 30 is a positive electrode. As illustrated in FIG. 1, the outside of bare cell 35 or the outside of the can 30 is covered with an insulating member 41, a lead 42, a circuit part 50, a case 90, and a label 97, preventing bare cell 35 from electrical and mechanical contact with the outside.

A circuit part 50 controls charging and discharging of the bare cell 35 and cuts off the battery upon an over current condition, thereby preventing damage and breakage of the secondary battery and equipment connected to the secondary battery. The circuit part 55 is attached to a second surface 92b outside the bare cell 35 and is coupled to the bare cell 35 by a plurality of leads 42, 42a, and 42b. As described in FIG. 1, the circuit part 50 can have a plurality of bare terminals 53 to provide an electrical connecting path to external devices. Lead 42 includes a first lead 42a that electrically connects electrode terminal 19 of the bare cell 35 to the circuit part 50, and a second lead 42b that electrically connects can 30 to the circuit part 50. Although FIG. 1 shows that second lead 42b contacts third surface 92c, the present invention is not limited to this as the second lead 42b can instead contact some other surface of can 30 and still be within the scope of the present invention.

An insulating member 41 is interposed between the circuit part 50 and the bare cell 35 as well as the first lead 42a and the bare cell 35. As illustrated above, in the present description of the embodiments of the present invention, the electrode terminal 19 is used as a negative electrode and the can 30 of the bare cell 35 is used as a positive electrode. Since the can 30 itself is used as a positive electrode, the can 30 should be insulated from the circuit part 50 which would otherwise contact the outer surface of the can 30. Therefore an insulating member 41 is interposed between the outer surface of the can 30 and the circuit part 50 as well as the outer surface of the can 30 and the first lead 42a so that the first lead 42a and the circuit part 50 can be electrically insulated from the can 30. Additionally, the insulating member 41 bends at the boundary between the first surface 92a and the second surface 92b of the can 30, and a aperture 41a can be formed on a part of the insulating member 41 that attaches to the first surface 92a to enable the electrode terminal 19 to electrically contact the first lead 42a.

A case 90 protects the core pack 60 from mechanical and electrical damage. The core pack includes bare cell 35, circuit part 50, lead 42 and insulating member 41. The case 90 is composed of a main case 70 and sub cases 81 (81a and 81b) that are formed on both ends of the main case 70. Connecting parts 65 (65a and 65b) connect the main case 70 to the sub cases 81a and 81b and the connecting part 65 enables the sub cases to move in an arrow direction (A) (see FIGS. 1 to 3). The case 90 can be easily produced by a plastic molding technique such as injection molding. In the present invention, main case 70 is integrally formed with sub case 81, thereby simplifying the fabrication process. The material used for case 90 is essentially a hard plastic, but the material used for the connecting part 65 should be ductile, elastic, and tensile. As the connecting part 65 enables the sub case 81 to rotate to then be connected to the bare cell 35, the connecting part 65 can break if it does not have properties like ductility, elasticity, tensility, and the equivalent. The case 90 will be further explained in conjunction with FIGS. 2 and 3.

The main case 70 is attached on the second surface 92b of the bare cell 35 and adheres to the outer surface of the bare cell 35 by accommodating a part of the circuit part 50 and the lead 42. To achieve this, the main case 70 is composed of three different surfaces and forms an empty space inside since the part connecting with the bare cell 35 is open. The bare cell 35, the circuit part 50 and part of the lead 42 are accommodated in the empty space of the main case 70. In other words, the main case 70 is has a cap shape and is inserted onto the bare cell 35. The main case 70 can include more than one bare terminal aperture 71 allowing the bare terminal 53 to be exposed through the case 90 to an outside. A groove 98, which prevents users from inserting inversely, can be formed to define the insertion direction of the secondary battery.

The sub case 81 is composed of a first sub case 81a which is connected to the first surface 92a of the bare cell 35, and a second sub case 81b which is connected to the third surface 92c. The sub case 81 is inserted onto the bare cell 35 in the same manner of the main case 70. A first lead 42a and apart of the insulating member 41 are accommodated between the first sub case 81a and the bare cell 35, and a second lead 42b is accommodated between the second sub case 81b and the bare cell 35. The connecting part 65 connects the sub case 81 and the main case 70. Additionally, more than one hanging groove 99 can be formed for the secondary battery to be attached and detached. The hanging groove 99 can be of a type that a part of the surface of the sub case 81 is depressed, but the present invention is not limited thereto.

A label 97 is attached to the bare cell 35 and covers the outer surface of the bare cell 35, thereby insulating the bare cell 35 from the outside. The label 97 can be attached to the bare cell 35 covering a part of the case 90 and the label 97 increases the binding force between the case 90 and the bare cell 35. Furthermore, product information can be displayed on the label 97. The label 97 can be embodied by using various kinds of insulators such as paper, film manufactured by using plastic resin, and a dual structure of film and paper, but the present invention is not limited thereto.

Figure 2:
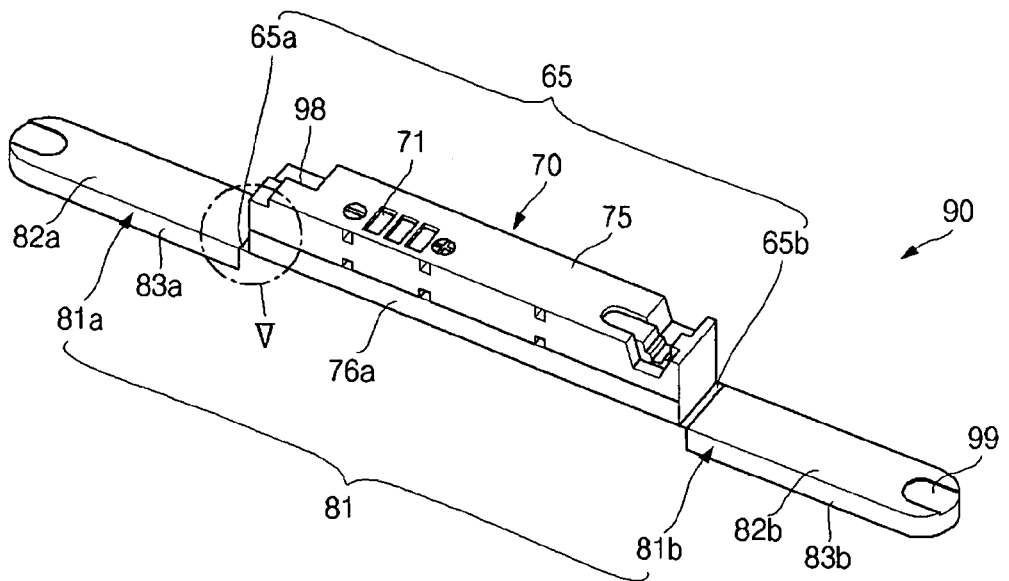
FIG. 2 is a perspective view illustrating the case in FIG. 1 according to one embodiment of the present invention.
Figure 3:
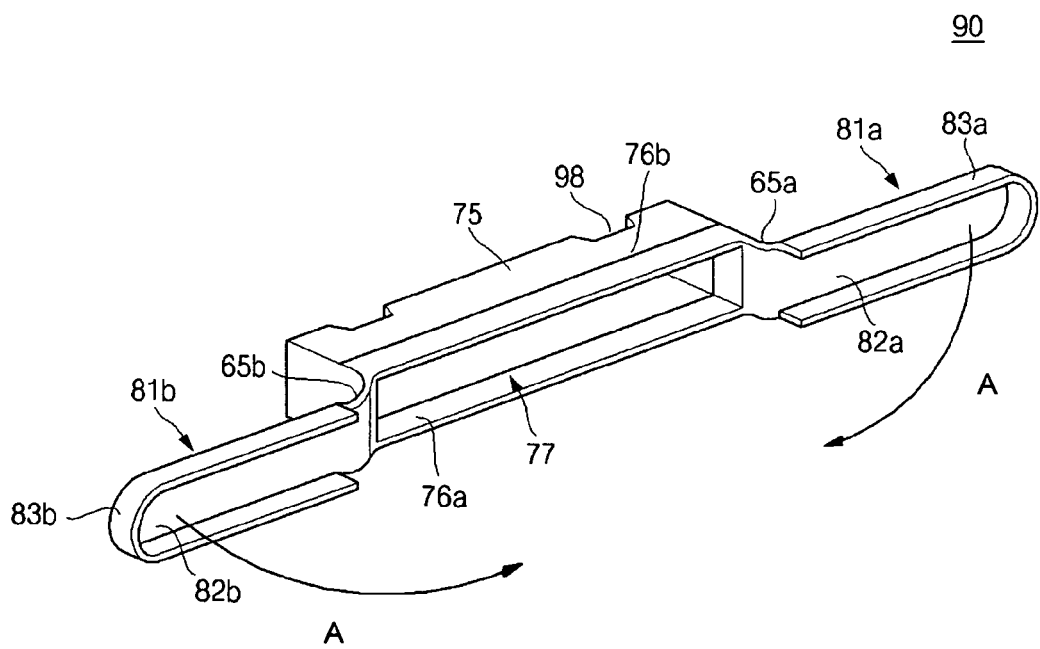
FIG. 3 is a perspective view illustrating the case at different angle from that of FIG. 2.

Turning now to FIGS. 2 and 3, FIG. 2 is a perspective view illustrating the case 90 of FIG. 1 according to one embodiment of the present invention and FIG. 3 is a perspective view illustrating the case 90 at a different angle from that of FIG. 2. Referring to FIGS. 2 and 3, the main case 70 includes a bare terminal aperture 71 and a groove 98 which prevents the user from inserting inversely. The main case 70 has a '⊏' shape as illustrated in FIG. 3. That is, the main case 70 is divided into a cap body 75 which has the bare terminal aperture 71, and cap sides 76a and 76b which extend from the cap body 75. Only two surfaces of the cap sides 76a and 76b are described in the drawing, but it is composed of four surfaces including the surface on which the connecting part is formed. The main case 70 forms a cap cavity 77 which accommodates circuit part 50 with the cap body 75 and the cap sides 76a and 76b. The inner surfaces of the cap sides 76a and 76b are adhered closely to the outer surfaces 92e and 92f of the bare cell 35. Therefore, the main case 70 is connected to the bare cell 35. The main case 70 is more closely connected to the bare cell 35 by the label 97 that covers a part of the outer surface of the cap sides 76a and 76b.

The connecting parts 65a and 65b connects sub case (81: 81a, 81b) to the main case 70. The sub case 81a and 81b is integrally molded with the main case 70 by a molding process. The sub case 81a and 81b is also composed of sub cap bodies 82a and 82c and sub cap sides 83a and 83b. FIGS. 2 and 3 describe the sub case 81a and 81b which connects to three surfaces 92d, 92e and 92f of the bare cell 35. However the present invention is not limited thereto, and a person having ordinary skill in the art can choose the shape of the sub case 81a and 81b so that it can be strongly connected to the bare cell 35.

The main case 70 is first connected to the bare cell 35 and the sub case 81 is then connected to the bare cell 35 by folding two ends thereof. Then, label 97 is attached covering the case 90, thereby completing the secondary battery.

As described above, the material for the case 90 should have a predetermined strength. The material for the connecting part 65 should have ductility, elasticity, tensility, or an equivalent property which can withstand bending several times. Therefore, it is preferable to use a plastic resin having a predetermined ductility rather than a plastic resin which hardens after molding the main case 90. Polyethyleneterephthalate or epoxy resin is the example of such a resin. The choice of the material is to be determined by the manufacturer considering characteristics such as the size and thickness of the case 90, and the size and shape of the secondary battery, and is not limited by the present disclosure.

Figure 4A:
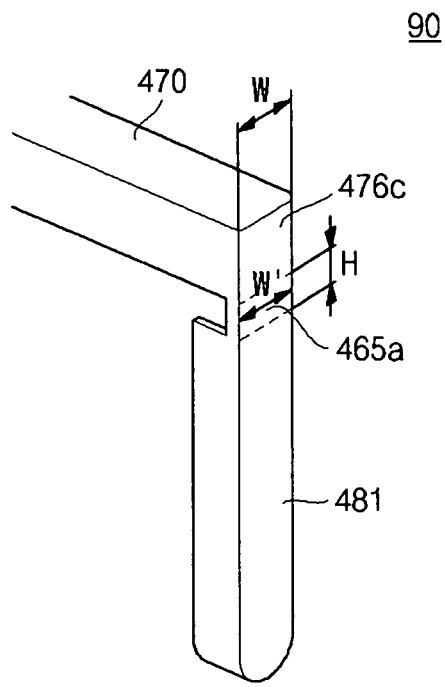
FIGS. 4a to 4d are views illustrating examples of a connecting part.

Turning now to FIGS. 4a to 4d, FIGS. 4a to 4d are views illustrating examples of a connecting part. FIG. 4a describes an entire surface type, FIG. 4b describes narrow width type, FIG. 4c describes lattice type, and FIG. 4d describes round type connecting part.

FIG. 4a illustrates an entire surface type connecting part 465a. The width of the first surface to the fourth surface (92a to 92d) of the can 30 composing the bare cell 35 are identical to each other. This is because the electrode assembly accommodated in the can 30 has almost the same thickness in the length direction. Therefore the width (W) of the main case 470 is almost same as that of the sub case 481. Unlike other instances, the width (W') of the an entire surface type connecting part 465a is almost same as the width (W) of the main case 470 or that of the sub case The length H of the connecting part 465a is designed so that it is easily moved, depending on the properties of the secondary battery. The width, thickness and additional properties of the connecting part 465a will be explained later in conjunction with FIG. 5.

Figure 4B:
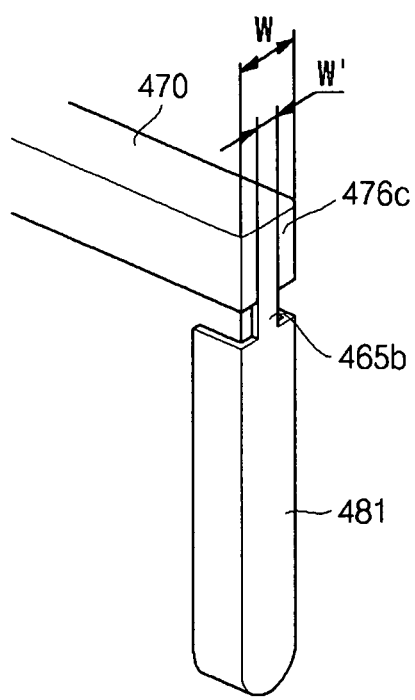

FIG. 4b describes a narrow width type connecting part 465b. The width (W') of the connecting part 465b is smaller than the width (W) of the sub case 481. FIG. 4b describes the connecting part 465b being positioned at the center in the width (W) direction, but it can instead be positioned on one edge in the width (W) direction and still be within the scope of the present invention. Here, the narrow with type connecting part 465b shown in FIG. 4b may have a thickness that is larger than that of the thickness of the surface type connecting part 465a shown in FIG. 4a. With such a thicker thickness for the connecting part 465b of FIG. 4b, it is possible to bend the narrow width type connecting part 465b by a same amount of external force that is needed to bend the surface type connecting part 465a of FIG. 4a. Alternatively, the narrow width type connecting part 465b of FIG. 4b may instead have a thickness that is equal to that of the surface type connecting part 465a of FIG. 4a. In this case, the narrow width type connecting part 465b can be easily bent by an external force that is less than an external force needed to bend the surface type connecting part 465a of FIG. 4a.

Figure 4C:
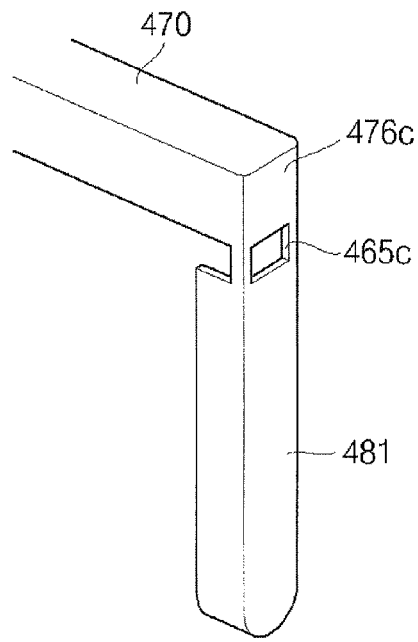

FIG. 4c describes a lattice type connecting part 465c. The lattice type connecting part 465c has an aperture at the center. In addition to this shape, various other shapes are possible and still are within the scope of the present invention.

Figure 4D:
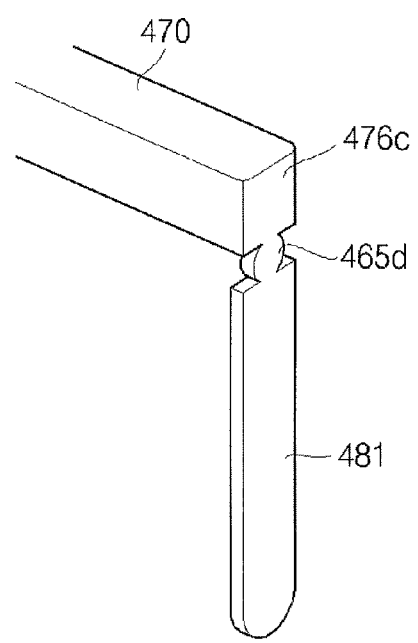

FIG. 4d describes a round type connecting part 465d. The round type connecting part 465d is similar to that of the narrow width type connecting part 465b and is advantageous for bending of more than two stages, but here it is just an example. FIG. 4d shows that the center of the connecting part 465d is convex but a concave connecting part is also possible and within the scope of the present invention.

Several examples of connecting parts were described in conjunction with FIGS. 4a to 4d, but other various shapes are possible depending on the degree of bending, the material and size of the case, thickness and the like, and still are within the scope of the present invention and a person having ordinary skill in the art can select them accordingly.

Figure 5A:
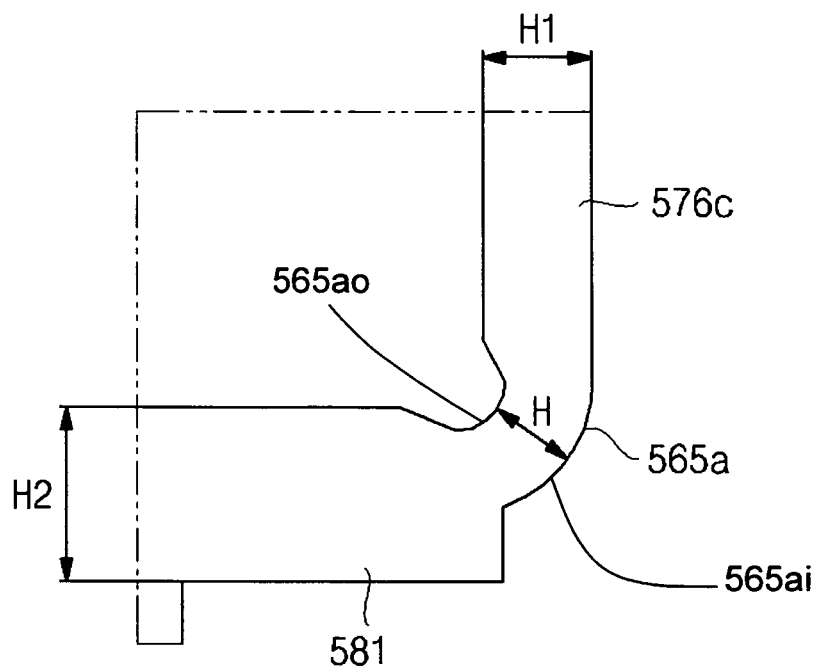
FIGS. 5a to 5c are close-up views of portion V of FIG. 2.
Figure 5B:
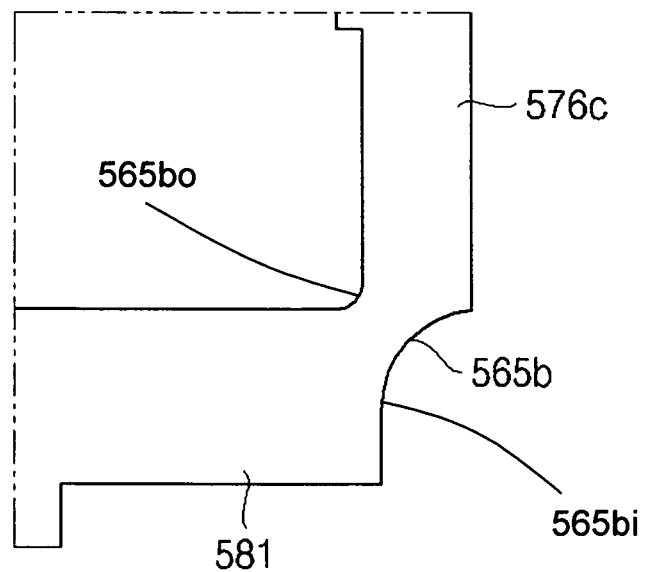
Figure 5C:
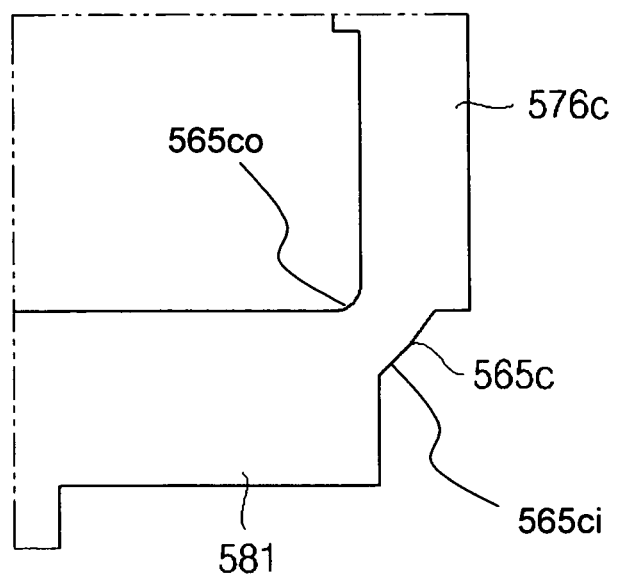

Turning now to FIGS. 5a to 5c, FIGS. 5a to 5c are close-up views of portion V of FIG. 2. Referring to FIGS. 5a to 5c, the thickness (H) of a connecting parts 565a, 565b, and 565c are smaller than or the same as the lessor of the thickness (H1) of a cap body 576c of the main case and the thickness (H2) of a cap body 581 of the sub case. If the thickness (H) is thicker than one or both thicknesses H1 and H2 above, it is not possible to bend and defects can occur in the main case or the sub case that has the thinner thickness than the connecting part 565. Therefore, the connecting parts 565a, 565b, and 565c preferably has thinner thickness or same thickness as the smaller of H1 and H2.

The thickness (H) of the connecting parts 565a, 565b, and 565c are more preferably less than ⅔ of the smaller of thickness (H1) of the main case and the thickness (H2) of the sub case. Such a thin thickness of the connecting parts 565a, 565b, and 565c makes it easy for the sub case to be bent with respect to the main case via the connecting parts 565a, 565b, and 565c. In more detail, in the present embodiment, since the connecting parts 565a, 565b, and 565c are L-shaped when the cases are injection molded, the main case is first coupled to second surface 92b of the bare cell and the sub case is bent to surfaces 92a and 92c of the bare cell adjacent to the surface 92b of the bare cell.

Referring to FIG. 5a, the connecting part 565a is attached to the bare cell by mating the outer surface of the bare cell to correspond to the inner surface 565ai of the connecting part 565a and both surfaces of the outer surface 565ao opposite to the inner surface 565ai of the connecting part 565a are curved after assembly to the bare cell. As such, the inner and outer surfaces 565ai, 565ao of the connecting part 565a are both curved so that the connecting part 565a is much thinner.

Turning now to FIGS. 5b and 5c, FIG. 5b and FIG. 5c are exemplary views of connecting parts 565b and 565c respectively that are comparatively thin to that of 565a. FIG. 5b is an exemplary view of the connecting part 565b having a curved inner surface 565bi and FIG. 5c is an exemplary view of the connecting part 565c having a plane inner surface 565ci. The curved or plane inner surface 565bi and 565ci of the connecting parts 565b and 565c respectively makes the connecting parts 565b and 565c thick as an aperture. Although the connecting parts 565b and 565c have the curved or plane inner surfaces 565bi and 565ci respectively with reference to FIGS. 5b and 5c respectively, when the connecting parts 565b and 565c have the curved or plane outer surfaces, the same effect can be obtained.

Figure 6A:
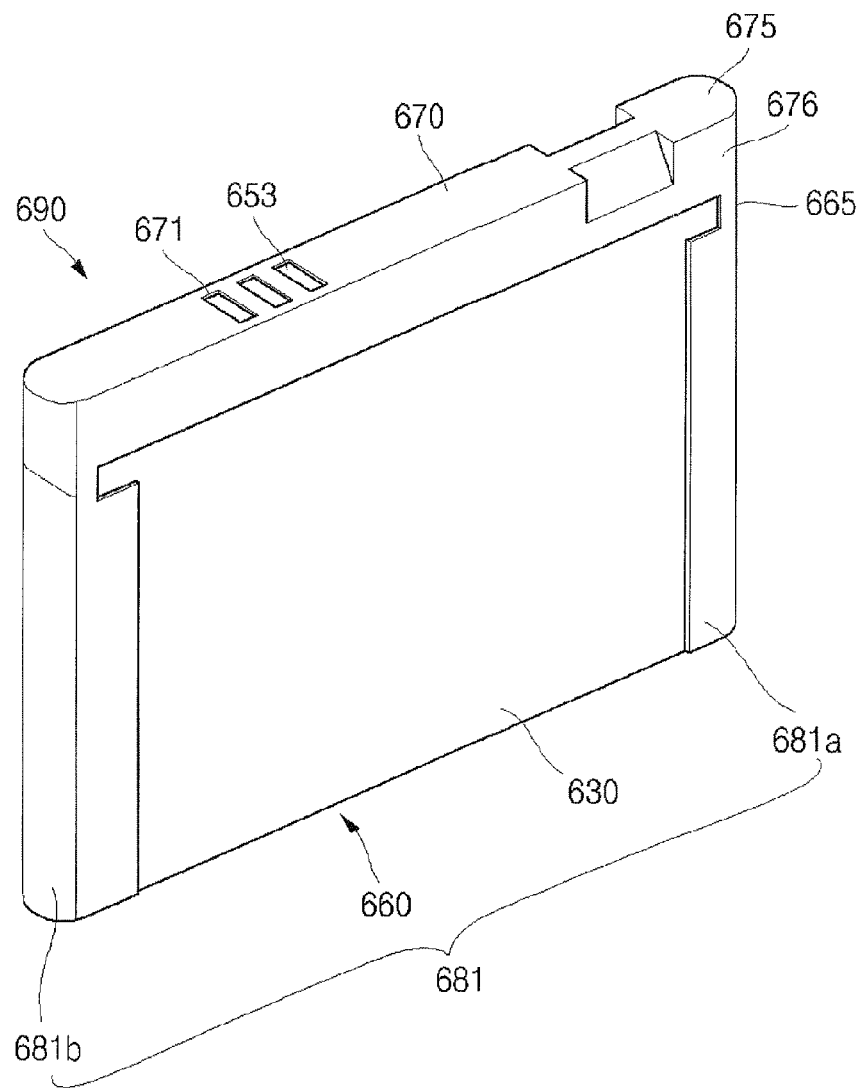
FIG. 6a is a drawing illustrating a core pack connected to a case.
Figure 6B:
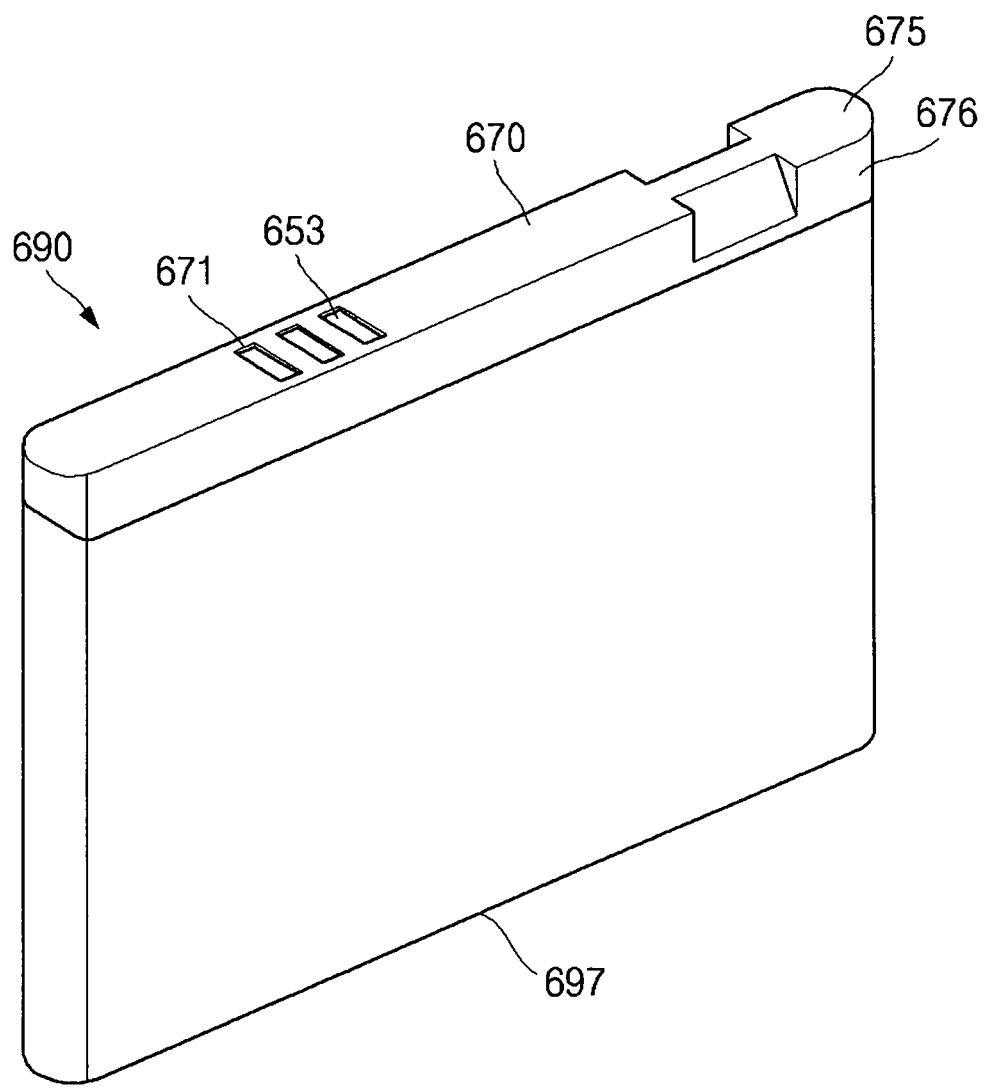

Turning now to FIGS. 6a and 6b, FIG. 6a is a drawing illustrating a core pack 660 connected to a case 690 and FIG. 6b is a perspective view which a label 697 is added to the apparatus shown in FIG. 6a. As described in FIG. 6a, a case 690 is attached to the outer surface of a can 630 of a core pack 660. As illustrated above, the case 690 is a cap shape. That is, a space corresponding to the outer surface of the can 630 is arranged in a main case 670 and in sub case 681, and the core pack 660 that includes the can 630 is inserted to the space. Here, an adhesive member is applied to the inner space of the case 690, thereby having the case 690 attached to the core pack 660.

When the case 690 is connected with the core pack 660 as described in FIG. 6a, a label 697 is attached to cover the core pack 660 and a part of the case 690. The label 697 can cover the sub case 681 and the main case 670 which is attached to cover the case 690. For example, the label 697 can cover almost the entire sub case 681, as can be seen in the FIG. 6b. The cap body 675 of the main case 670 is not covered by the label 697, but the label 697 can cover the cap side part 676 of the main case 670. Even though FIG. 6b shows the label 697 covering the entire sub case 681, the label 697 can be attached to the cap side 676 only from the sub case 681. Here, the shape and scope of the label 697 being attached changes depending on the shape of the label 697 and the present invention is not limited by FIGS. 6a and 6b. However, the bonding force of the case 690 and the value of the product can be increased by having the label 697 cover a part of the case 690.

Figure 7:
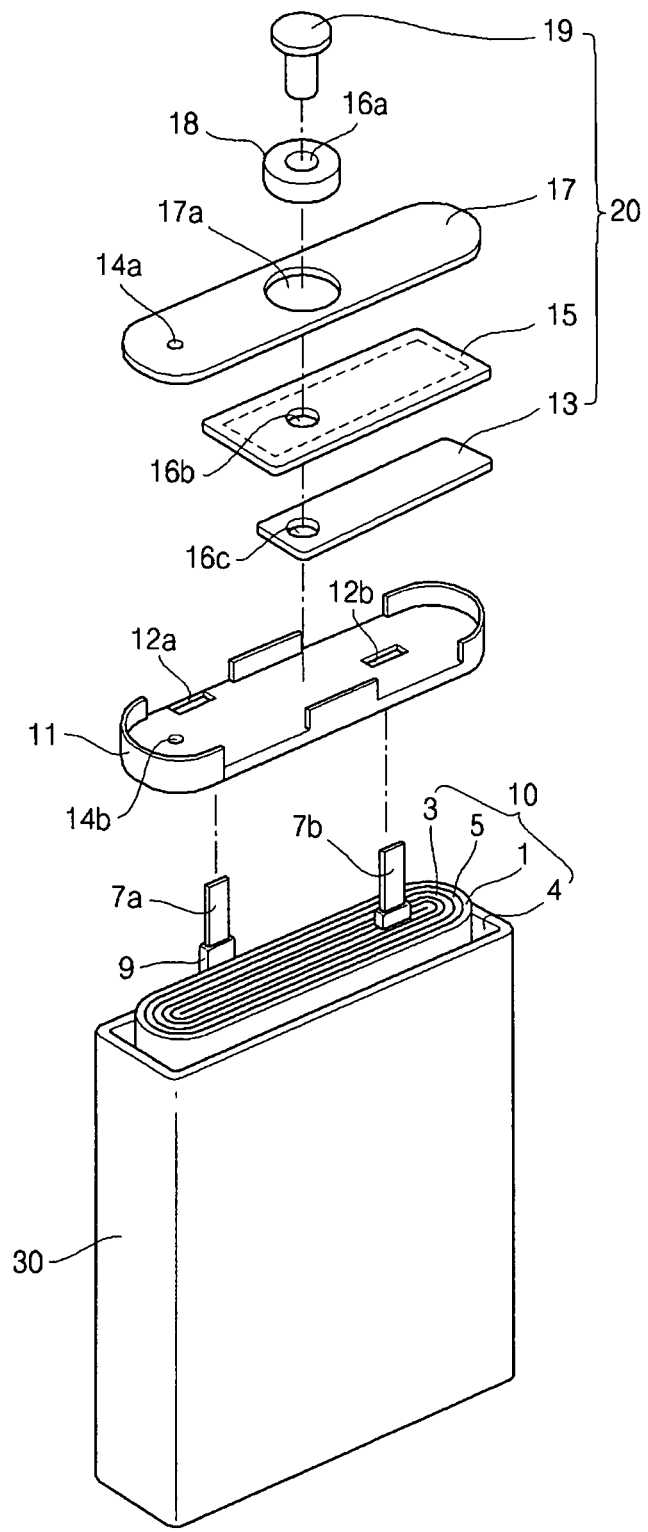
FIG. 7 is an exploded perspective view illustrating a bare cell that is applicable to embodiments of the present invention.

Turning now to FIG. 7, FIG. 7 is an exploded perspective view illustrating a bare cell that is applicable to embodiments of the present invention. Referring to FIG. 7, a bare cell includes an electrode assembly 10 having withdraw terminals (or electrode tabs 7a, 7b) of a positive electrode and a negative electrode 3, a can 30 which has its one side open and has a cavity 4 for accommodating the electrode assembly 10, a cap assembly 20 connected to the opening of the can 30, and an insulating case 11.

The can 30 has an approximate rectangular parallelepiped pole (or a well) shape and is usually manufactured by the deep drawing method. The can 30 accommodates the electrode assembly 10 in its cavity 4 and is connected with the cap assembly 20 and the insulating case 11 through the opening. The materials of the can 30 are preferably aluminum (Al) or an aluminum alloy which have high mechanical and electrical properties such as thermal resistance, abrasion resistance, and electrical conductivity, but other materials according to the application are still within the scope of the present invention. Further, the can 30 can be used as a positive electrode since it is coupled to the positive electrode terminal 7a, but the present invention is not limited thereto.

The electrode assembly 10 has the positive electrode 1 and the negative electrode 3 in a wide plate shape or a metal foil shape to increase electric capacity, and a separator 5 is inserted between the positive electrode 1 and the negative electrode 3 and is stacked and spirally wound in a jelly roll configuration.

The positive electrode 1 and the negative electrode 3 are manufactured by coating and drying slurry on aluminum metal foil and copper metal foil respectively. Here, the slurry is composed of the respective active materials of positive electrode 1 and negative electrode 3 and a fixing material attaching the active materials on metal foil. Lithium-containing oxide is used as the positive electrode active material, and carbon-based material such as hard carbon, soft carbon, or graphite are used as the negative electrode active material, but the present invention is not limited thereto.

The separator 5 is interposed between the positive electrode 1 and the negative electrode 3 to insulate the positive electrode 1 and the negative electrode 3. The separator 5 also provides a path for ions to move between the positive electrode 1 and the negative electrode 3. To achieve this, the separator 5 can be porous polyethylene, polypropylene, and co-polymer of polyethylene and polypropylene, but the present invention is not limited thereto. It is advantageous that the separator 5 is bigger than the width of the positive electrode 1 and negative electrode 3 to prevent a short circuit between the two electrodes.

A positive electrode terminal 7a and a negative electrode terminal 7b, which are connected respectively to the positive electrode 1 and the negative electrode 3, extend from the electrode assembly 10. The positive electrode terminal 7a and the negative electrode terminal 7b are primary conductive paths to external circuits or devices, and an insulating tape 9 is included on a portion of the terminals 7a, 7b that extend to the outside of the electrode assembly 10 to prevent a short circuit between the electrodes 1 and 3. The positive electrode terminal 7a connects to the can 30 and the negative electrode terminal 7b connects to the electrode terminal 19 of the cap assembly 20, but the present invention is not limited thereto.

The cap assembly 20 includes a cap plate 17, an electrode terminal 19, an insulating plate 15, and a terminal plate 13. The cap plate 17 includes a terminal through aperture 17a and an electrolyte injection aperture 14*a*. The electrode terminal 19 penetrates through the terminal through aperture 17*a* having a gasket 18 for insulation and is coupled to the negative electrode terminal 7*b*. To achieve this, a first terminal aperture 16*a* is formed in the gasket 18. The cap plate 17 can be coupled to the externally extended portion of the positive electrode terminal 7*a* through a lead aperture 12*a* of the insulating case 11. Electrolyte injection apertures 14*a* and 14*b* is formed in the cap plate 17 and in the insulating case 11 respectively are used as injection apertures so that electrolyte can be injected into the can 30 and be sealed up after the injection. The insulating plate is included to insulate the cap plate 17 from the terminal plate 13, and the electrode terminal 19 penetrates through the insulating plate 15. To achieve this, a second terminal aperture 16*b* is formed in the insulating plate 15. The terminal plate 13 is electrically connected to the electrode terminal and to the negative electrode terminal 7*b*. A third terminal aperture 16*c* is formed in the terminal plate 13 to enable the terminal plate to be connected to negative electrode terminal 7*b*.

The secondary battery of FIG. 7 further includes an insulating case 11. One side of the insulating case 11 is connected to the can 30 and the upper part of the electrode assembly 10, and the cap assembly 20 is connected to the other side of the insulating case 11. An electrolyte injection aperture 14*b* and lead apertures 12*a*, 12*b* are formed in the insulating case 11.

Figure 8:
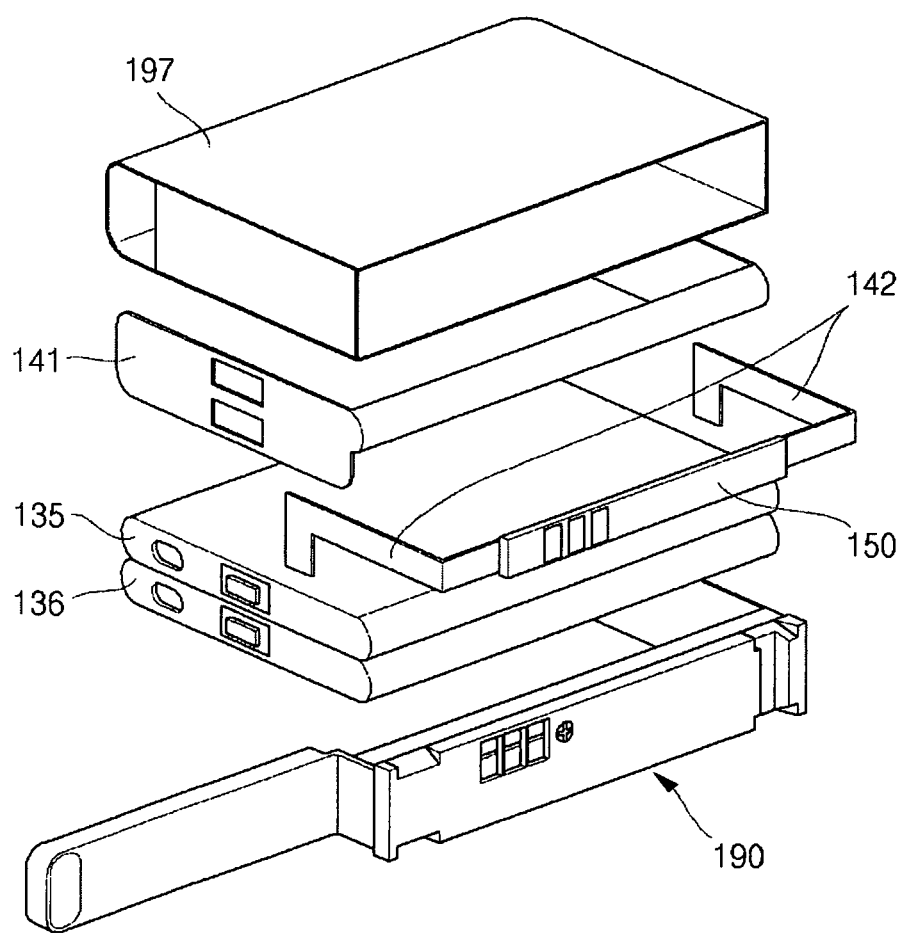
FIG. 8 is an exploded perspective view of the secondary battery according to the other embodiment of the present invention.

Turning now to FIG. 8, FIG. 8 is an exploded perspective view of the secondary battery according to the other embodiment of the present invention. Referring to FIG. 8, the secondary battery of the present embodiment includes a bare cell 135, 136, a circuit part 150, a case 190 and a label 197. The secondary battery further includes an insulating member 141 and a lead 142.

As described above, the secondary battery of the present invention can increase production efficiency by connecting a core pack to a hard case, the hard case being easily attached and detached and being manufactured in advance. The secondary battery provides a hard case that is integrally formed to reduce the number of parts and to simplify the fabricating process, thereby reducing the fabricating cost of the secondary battery. Further, the secondary battery provides a hard case that the core pack can be connected to by bending the hard case. Therefore, the assembly process is easy and convenient and defects can be eliminated.

As described above, although the exemplary embodiments of the invention have been described above, the invention is not limited thereto. Therefore, it would be appreciated by those skilled in the art that various modifications and changes of the invention can be made without departing from the scope and spirit of the invention, the scope of which is defined in the appended claims and their equivalents.

What is claimed is:

1. A secondary battery, comprising:
    at least one rectangular-shaped, rechargeable bare cell including a first surface, a second surface adjacent to the first surface and including an electrode terminal, a third surface opposite the first surface, a fourth surface opposite the second surface and a fifth surface opposite a sixth surface, the first through fourth surfaces being smaller and narrower than the fifth and the sixth surfaces, the second and fourth surfaces being shorter than each of the first and third surfaces, the fifth and sixth surfaces being large surfaces adjacent to each of the first through fourth surfaces;
    a circuit part electrically coupled to the at least one bare cell; and
    a case comprised of an insulator covering the circuit part coupled to the at least one bare cell, wherein the case includes a main case arranged on the first surface of the at least one bare cell, a first sub case arranged on the second surface of the at least one bare cell and a second sub case arranged on the fourth surface of the at least one bare cell,
    wherein the first sub case includes a sub cap body that covers the second surface of the at least one bare cell and a plurality of sub cap sides extending from the sub cap body and covering edge portions of the third, fifth and sixth surfaces of the at least one bare cell, which are adjacent to the second surface, the second sub case includes a sub cap body that covers the fourth surface of the at least one bare cell and a plurality of sub cap sides extending from the sub cap body and covering edge portions of the third, fifth and sixth surfaces of the at least one bare cell, which are adjacent to the fourth surface,
    wherein the main case and the first sub case are integrally and rotatably connected via a first connecting part, and the main case and the second sub case are integrally and rotatably connected via a second connecting part.

2. The secondary battery of claim 1, wherein the main case comprises:
    a body that covers the first surface of the at least one bare cell and that accommodates the circuit part within; and
    a plurality of sides extending from the body and covering portions of the fifth and sixth surfaces of the at least one bare cell, which are adjacent to the first surface.

3. The secondary battery of claim 1, the first and second connecting parts are comprised of a ductile, elastic and electrically insulating material that allow the first sub case and the second sub case to rotate with respect to the main case, the main case being comprised of a hard plastic.

4. The secondary battery of claim 3, wherein the connecting parts connect ends of the main case to a body of the first and second sub cases respectively.

5. The secondary battery of claim 3, wherein the connecting parts are entire surface type connecting parts having same widths as that of a body of the first and second sub cases.

6. The secondary battery of claim 3, wherein the connecting parts are narrow width type connecting parts having smaller widths than that of a body of the first sub case.

7. The secondary battery of claim 3, wherein the connecting parts are lattice type connecting parts partly having a lattice type aperture.

8. The secondary battery of claim 3, wherein the connecting parts are round type connecting parts having wider center portions than both ends thereof.

9. The secondary battery of claim 3, wherein a thickness of the connecting parts are equal to or less than a smaller of a thickness of the main case and a thickness of the first sub case.

10. The secondary battery of claim 3, wherein a cross-section of the connecting parts are L-shaped.

11. The secondary battery of claim 10, wherein the L-shaped connecting parts have curved inner surfaces corresponding to the at least one bare cell and curved outer surfaces opposite to the curved inner surfaces.

12. The secondary battery of claim 1, further comprising an insulation member arranged between the at least one bare cell and the circuit part.

13. A secondary battery, comprising:
    at least one bare cell;
    a circuit part electrically coupled to the at least one bare cell; and a case covering the circuit part coupled to the at least one bare cell, wherein the case includes a main case arranged on a first surface of the at least one bare cell and a first sub case and a second sub case arranged on surfaces of the at least one bare cell that are adjacent to the first surface of the at least one bare cell, each of the first and second sub cases being attached to opposite ends of the main case by first and second connecting parts respectively and being integral with the main case, wherein the main case is comprised of a hard plastic and the first and second connecting parts are comprised of a ductile plastic resin that are comprised of epoxy resin and allow the first sub case and the second sub case to rotate with respect to the main case.

14. The secondary battery of claim 1, further comprising a label attached to surround the connecting parts of the case.

15. The secondary battery of claim 1, further comprising a label attached to surround a body and a side of the first sub case and a side of the main case.

16. The secondary battery of claim 1, the at least one bare cell comprises two bare cells stacked on top of each other.

17. The secondary battery of claim 3, the connecting parts are comprised of epoxy resin.

18. The secondary battery of claim 1, wherein portions of the third surface of the bare cell other than the edge portions adjacent to the first and second surfaces are exposed and are not covered by the case.

\* \* \* \* \*